US009727457B2

United States Patent
Carter et al.

(10) Patent No.: US 9,727,457 B2
(45) Date of Patent: Aug. 8, 2017

(54) MINIMIZING LATENCY DUE TO GARBAGE COLLECTION IN A DISTRIBUTED SYSTEM

(71) Applicant: LinkedIn Corporation, Mountain View, CA (US)

(72) Inventors: Andrew Carter, Mountain View, CA (US); Eric Manuel, Foster City, CA (US); Steven Callister, Mountain View, CA (US); Karan R. Parikh, San Francisco, CA (US); Siddharth Shah, Pittsburgh, PA (US)

(73) Assignee: LinkedIn Corporation, Sunnyvale, CA (US)

( * ) Notice: Subject to any disclaimer, the term of this patent is extended or adjusted under 35 U.S.C. 154(b) by 174 days.

(21) Appl. No.: 14/921,753

(22) Filed: Oct. 23, 2015

(65) Prior Publication Data

US 2017/0116115 A1    Apr. 27, 2017

(51) Int. Cl.
*G06F 12/08* (2016.01)
*G06F 12/02* (2006.01)
*G06F 3/06* (2006.01)
*G06F 12/0802* (2016.01)

(52) U.S. Cl.
CPC ........ *G06F 12/0253* (2013.01); *G06F 3/0604* (2013.01); *G06F 3/0629* (2013.01); *G06F 3/0683* (2013.01); *G06F 12/0802* (2013.01); *G06F 2212/1044* (2013.01); *G06F 2212/60* (2013.01)

(58) Field of Classification Search
CPC ............ G06F 12/0802; G06F 12/0253; G06F 3/0604; G06F 3/0629; G06F 3/0683; G06F 2212/60; G06F 2212/1044
See application file for complete search history.

(56) References Cited

U.S. PATENT DOCUMENTS

| | | | | |
|---|---|---|---|---|
| 2007/0033240 A1* | 2/2007 | Barsness | ............. | G06F 12/0253 |
| 2009/0144422 A1* | 6/2009 | Chatley | ................. | G06F 3/0613 709/226 |
| 2009/0300092 A1* | 12/2009 | Corry | ...................... | G06F 9/505 709/202 |
| 2013/0111153 A1* | 5/2013 | Lee | ......................... | G06F 3/067 711/154 |
| 2016/0124847 A1* | 5/2016 | Malwankar | ......... | G06F 12/0253 711/103 |

OTHER PUBLICATIONS

Anil Systems, "Understanding Java Garbage Collection", dated 2014, 19 pages.

* cited by examiner

*Primary Examiner* — Hiep Nguyen
(74) *Attorney, Agent, or Firm* — Hickman Palermo Becker Bingham LLP; Daniel D. Ledesma

(57) ABSTRACT

Techniques are provided for minimizing latency due to garbage collection in a distributed system. Time data is stored at a computing device. The time data indicates when each of multiple computing nodes (e.g., servers) in the distributed system might be performing (or is scheduled to perform) a garbage collection operation. The computing device receives a first request and, in response, determines, based on the time data, one or more computing nodes to process a second (e.g., related) request, which may contain identical content as in the first request. The second request is sent to the one or more computing nodes.

20 Claims, 5 Drawing Sheets

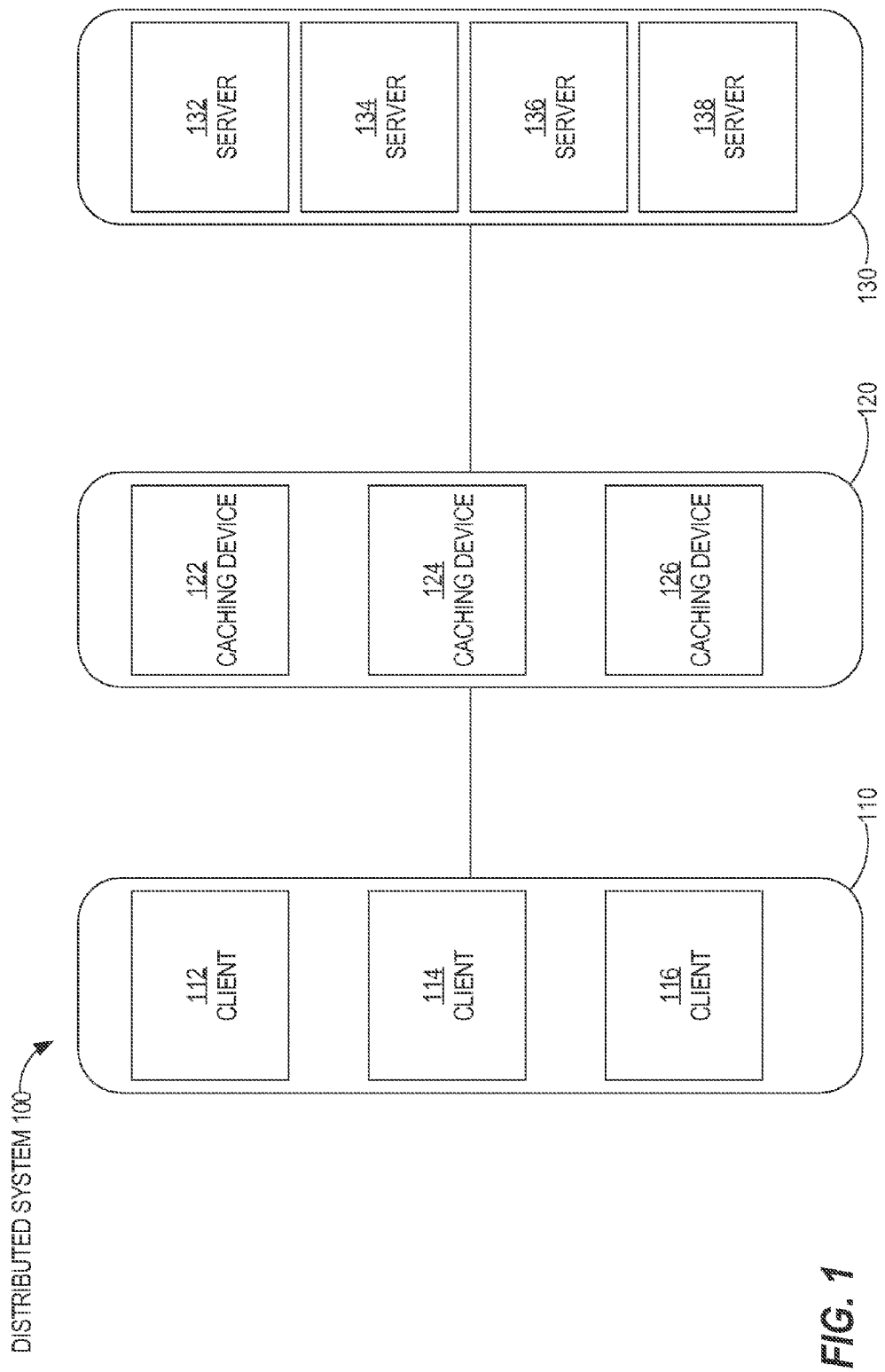

MINIMIZING LATENCY DUE TO GARBAGE COLLECTION IN A DISTRIBUTED SYSTEM

TECHNICAL FIELD

The present disclosure relates to data processing and, more specifically, to reducing latency in a distributed system.

BACKGROUND

Backend computing systems have become increasingly complex for enterprises that support many end-users. Examples of such enterprises include social network providers (e.g., LinkedIn and Facebook), banking institutions, and online game providers. In many of these enterprises, system responsiveness is imperative.

One operation that backend computing systems perform is "garbage collection." In the context of computers, garbage collection (GC) is a form of automatic memory management where a process (or "garbage collector") attempts to reclaim "garbage" or memory that is occupied by objects that are no longer in use by the program. Garbage collection is often portrayed as the opposite of manual memory management, which requires the programmer to specify which objects to deallocate and return to the memory system. Garbage collection is a significant part, for example, of the Java virtual machine's (JVM's) dynamic memory management system. However, garbage collection may require a substantial portion of total processing time in a device and, as a result, can have significant influence on performance of multiple programs executing on the device.

For example, if a requesting computer (client) sends a request for data to another computer (server) that is in the middle of performing a garbage collection operation (also referred to as "GCing"), then the client may have to wait longer for a response from the server than if the receiver was not GCing.

One approach to avoid sending a request to a GCing server is referred to as the lease approach. Under the lease approach, a client requests a lease before sending a request to a server. If the client receives a lease from a server, then the client can send a request to that server. Otherwise, the client must request a lease from another server. If a server determines to GC, then the server stops giving out leases to clients and invalidates existing leases with clients. This means that no requests are active (at least with respect to the server) while the server is GCing. However, in this approach, there is the overhead of the communication required to request, grant, and revoke leases. In a relatively large distributed system, the number of requests between clients and servers can be significant.

Another disadvantage of the lease approach is referred to as the London Bus problem where servers, over time, tend to all GC at the same time, causing clients to have to wait until there are servers that can grant leases.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram that depicts an example distributed system that minimizes latency due to garbage collection, in an embodiment;

DETAILED DESCRIPTION

Figure 2A:
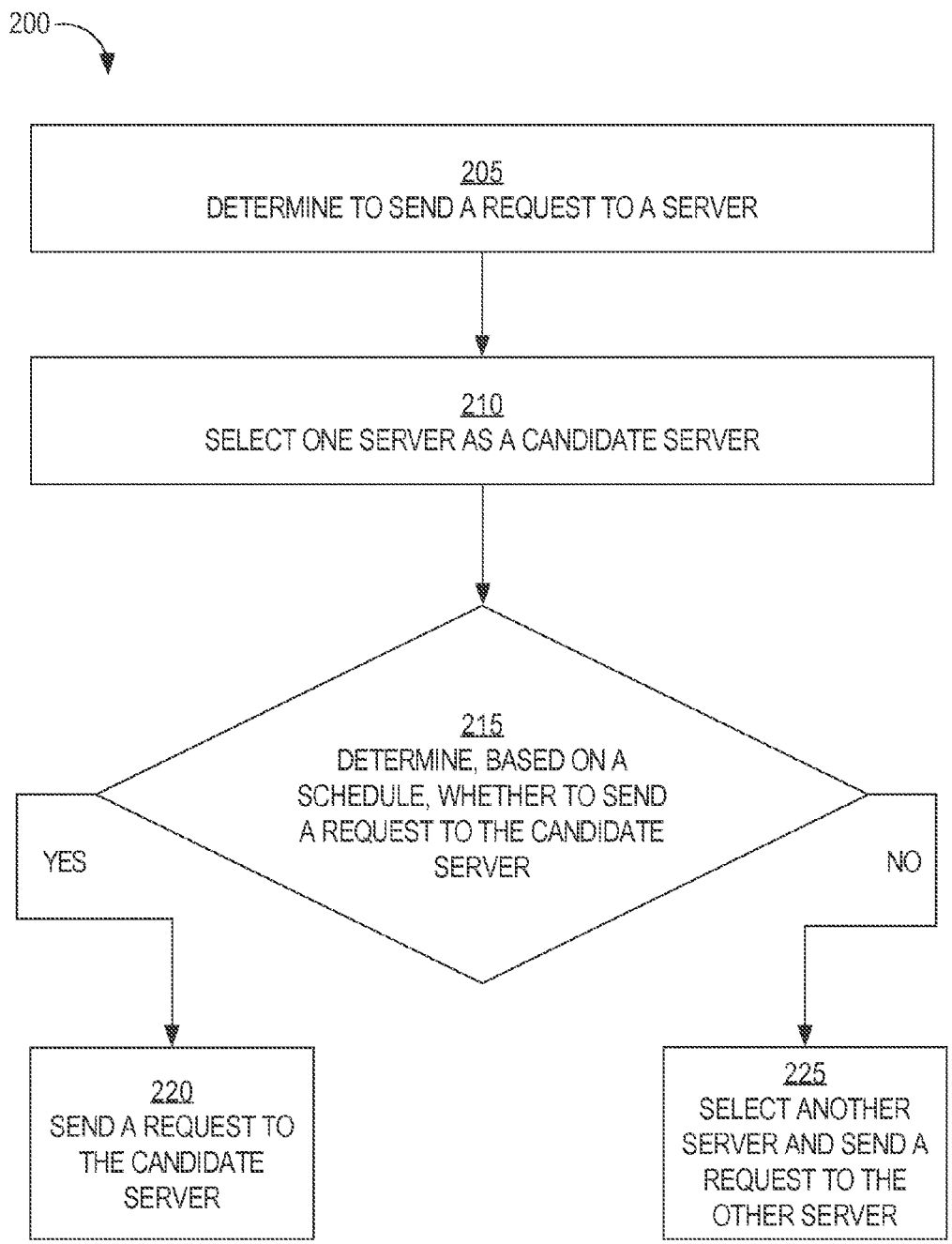
FIGS. 2A-2B are flow diagrams that depict processes for selecting a server for processing a request, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for minimizing latency due to garbage collection in a distributed system. Time data is created and stored at one or more client devices. The time data indicates when each server of multiple servers is going through a garbage collection operation. The time periods when the multiple servers perform a garbage collection operation are staggered such that one time period does not overlap any other time period. Thus, if a client device determines to request data from one of the multiple servers, then the client device checks the time data as at least one criterion in determining to which server to send a request.

The time data may be shared by one or more devices in a caching layer that logically resides between the client layer and the server layer. Thus, caching devices may also leverage the time data in selecting a server to which to send a request. Additionally, one or more servers may also store or have access to the time data if the one or more servers are configured to request data from other servers that perform garbage collection.

While the following description includes examples in the context of social networks, embodiments are not so limited. The techniques described herein may be used in any type of distributed system where a single request may be satisfied by sending to one of multiple servers or groups of servers.

Example Distributed System

FIG. 1 is a block diagram that depicts an example distributed system 100 that minimizes latency due to garbage collection, in an embodiment. The various components of distributed system 100 are implemented at least partially by hardware at one or more computing devices, such as one or more hardware processors executing instructions stored in one or more memories for performing various functions described herein. For example, descriptions of various computing elements as described in this application may be interpreted by one of skill in the art as providing pseudo-code, an informal high-level description of one or more computer structures. The descriptions of the computing elements may be converted into software code, including code executable by an electronic processor. System 100 illustrates only one of many possible arrangements of computing elements configured to perform the functionality described herein. Other arrangements may include fewer or different computing elements and the division of work between the computing elements may vary depending on the arrangement.

Distributed system 100 includes clients 110, caching devices 120, and servers 130. Although a certain number of clients, caching devices, and servers are depicted, distributed system 100 is not limited to the depicted number. For example, distributed system 100 may have more or less than three clients or more or less than four servers. Additionally, distributed system 100 may not include any caching devices 120. Instead, clients 110 send requests "directly" to servers 130 over a network, such as a local area network. Thus, such requests may traverse one or more intermediate computing devices, such as hubs, switches, or routers. Alternatively, at least some of clients 110 are directly connected to multiple servers 130. A communication protocol that is used to send messages between clients 110 and caching devices 120 may be different than a communication protocol used to send messages between clients 110 and servers 130.

Each of clients 112-116 is implemented in software and executes on a computing device. A single computing device may include a single client or multiple clients. Each of clients 112-116 sends requests directed to servers 130. In the embodiment where distributed system 100 includes caching devices 120, clients 110 send at least some requests to caching devices 120. Some requests from one of clients 112-116 are requests for data that is stored at, or accessible to, servers 130 or caching devices 120. A request may be a request to add or update data that is stored at, or accessible to, servers 130.

A request from one of clients 112-116 may be initiated by user input, such as user input received through an end-user device, such as a desktop computer, a laptop computer, a tablet computer, a smartphone, or a wearable device. The user input initiates a request that is transmitted over a network, such as LAN, WAN, or the Internet, to distributed system 100. One of clients 112-116 may be the first component (in, or related to, distributed system 100) that processes that request. Alternatively, that request may be initially processed by a front-end server or device (not depicted) in distributed system 100, which forwards the request to one of clients 112-116.

Each of clients 112-116 may be programmed to handle the same types (or all types) of requests. Thus, a front-end server may select one of clients 112-116 to process any particular request. The selection may be a random selection or based on one or more criteria, such as the respective loads of clients 112-116 and/or a round-robin technique. The front-end server may even select multiple of clients 112-116 to process different portions of a request from an end-user device.

Alternatively, each of clients 112-116 is programmed to handle different types of requests or requests for different types of data or operations. For example, client 112 may be programmed to process requests for messages received by a particular member of a social network, client 114 may be programmed to process requests for profile information of another member of the social network, and client 116 may be programmed to process requests for sponsored target to be displayed to the particular member. In this scenario, a front-end server that receives requests from outside distributed system 100 determines which of clients 110 is to process a request based on the type of request, the type of operation that is requested, and/or the type of data requested.

Each of clients 112-116 is communicatively coupled to servers 130 and, for at least some requests, selects which server is to process the request. In an embodiment, a single client, in response to receiving a request, generates multiple requests and sends each generated request to a different server of servers 132-138. For example, client 112 receives a request for information about second degree connections of a particular member of a social network. Client 112 then sends, to each of servers 132-138, a request that indicates which primary connections of the particular member to analyze. For example, a first request (e.g., to server 132) may be to retrieve profile information of the primary connections of the first ten primary connections of the particular member while a second request (e.g., to server 134) may be to retrieve profile information of the primary connections of the next ten primary connections of the particular member.

While FIG. 1 depicts a single line from clients 110 to caching devices 120 and a single line from caching devices 120 to servers 130, these lines reflect logical connections such that any client of clients 110 can communicate with any of caching devices 120. Similarly, any of clients 110 can communicate with any of servers 130. Thus, an implementation may contain a different physical communication path between, for example, client 112 and each of servers 132-138.

Servers 130 receive requests from clients 110 and, optionally, from caching devices 120. Servers 130 may execute on separate computing nodes or machines. Additionally or alternatively, multiple servers may execute on a single computing node. A computing node includes memory and one or more processors that execute instructions that are stored in the memory. A computing node may include both volatile memory (e.g., RAM) and non-volatile memory (e.g., hard disk storage).

Each of servers 132-138 has access to a database (not depicted). In one embodiment, each server accesses the same database. In other words, a single database is shared among servers 130. Alternatively, distributed system 100 includes multiple databases, each accessed by a different server or different set of two or more servers. In the multiple database scenario, each database may be a copy of each other database. Thus, the databases may be synchronized regularly or in response to certain events. Thus, at certain points in time, one database might not be synchronized with another database, which might be acceptable depending on the services provided by distributed system 100. For example, if a banking institution owns or manages databases with financial account information, then complete or full synchronization may be required before servicing at least some requests.

In an embodiment where distributed system 100 includes caching devices 120, a server of servers 130 generates and sends two responses in response to a request from a client (e.g., client 112). One response is sent to the requesting client and another response is sent to at least one of caching devices 122-126. Later, clients 112-116 may retrieve data contained in the latter response from one of caching devices 122-126 instead of waiting for one of servers 132-138 to retrieve the data (again) from storage, whether volatile or non-volatile. Caching devices 120 may store the results of previous queries or partial queries that can be used to answer subsequent queries or partial queries.

Contents of a Schedule

In an embodiment, at least one of clients 112-116 stores, or has access to, a schedule (or time data) that indicates when the client can send a request to each of servers 132-138. This is referred to as an "affirmative" schedule. Alternatively, the schedule may indicate when clients 112-

116 should not send requests to each of servers 132-138. This is referred to as a "negative" schedule.

A negative schedule indicates multiple slots, each slot corresponding to a different server and a different time period. For example, a first slot is associated with server 132 and the first two seconds after every five minute interval. A second slot is associated with server 134 and the second two seconds after every five minute interval. The system clocks of clients 112-116 may be synchronized such that the five minute interval of server 132 match the five minute intervals of server 134. The system clocks might not be exact, but may be within a couple milliseconds of each other, which difference may not be critical for achieving one or more benefits of the techniques described herein.

In an embodiment, each slot corresponds to a different, non-overlapping time period, such as the example above. Alternatively, the time period of one slot may overlap with the time period of another slot. The overlapping time periods may be a complete overlap or a partial overlap. Either way, multiple servers may be garbage collecting simultaneously.

In an embodiment, a slot corresponds to multiple servers. For example, server 132 and server 134 may garbage collect beginning at the same time or beginning at different times but overlapping for a period of time. Depending on how a schedule is organized, clients 112-116 may check multiple slots. For example, a single slot indicated in a schedule may correspond to only a single server; however, multiple slots may correspond to the same time period or to overlapping time periods. Thus, a client may check multiple slots to identify a server to which to send a request. As another example, a single slot indicated in a schedule may identify (or otherwise be associated with) multiple servers. Thus, a slot indicated in a schedule may list multiple servers that are associated with that slot.

Length of a Slot

A time period of a slot in a negative schedule includes a period of time in which the corresponding server is garbage collecting. This period of time is referred to as $T_{GC}$. For positive schedules, $T_{GC}$ occurs between slots.

The time period of a negative slot may also include a period of time in which the corresponding server is not garbage collecting. Such a period of time corresponds to time spent by the corresponding server(s) to process existing requests. This period of time is referred to as $T_R$. Such a period of time may be beneficial because, without $T_R$, a client might send the corresponding server a request right before the server begins to GC. For example, a client sends a request at time T1 and the server begins garbage collection at time T2. If the server did not GC during any portion of processing the request, then processing the request would only take until time T4. However, in this example, if the server completes garbage collection at time T6, the server might not complete processing the request until time T8. Thus, it would have been better for the client to send the request to another server.

Therefore, in an embodiment, a slot includes a time to garbage collect and a time to finish processing one or more requests. $T_{GC}$ may be determined based on a maximum time it takes a server to garbage collect, an average time, or a median time or other quantile. Similarly, $T_R$ may be determined based on a maximum time it takes a server to process one or more (e.g., ten) requests, an average time, or a median time or other quantile. Such requests may be requests that request the maximum amount of data or processing. If $T_{GC}$ and $T_R$ are maximum times and a slot is set to $T_{GC}+T_R$, then it may be extremely unlikely that a request sent to a server prior to such a slot will be slowed down due to the server garbage collecting since the server should complete processing the request before garbage collection commences.

In a related embodiment, a client might send a request to a server at a time that corresponds to the end of the server's slot. The server may have completed garbage collecting when the server receives the request. This is possible because each of servers 132-138 garbage collects at certain times, whether or not the server needs to perform garbage collection. Thus, if $T_{GC}$ is a maximum possible time to garbage collect, many garbage collection operations will complete before the end of the corresponding slot time period. Sending a request to a server at a time that is at the end of the server's slot may be useful if the client determines that other available servers are extremely busy and, thus, sending the request to those servers may result in latency for non-garbage collection reasons.

Leveraging a Schedule

A client uses a schedule to determine whether to send a request to one or more servers 132-138. The schedule may be one of multiple criteria that are considered when selecting one of servers 132-138. For example, one or more performance metrics of each of servers 132-138 may be reported to a client and the client uses the performance metrics to determine which server is to process a request. A performance metric may simply be whether the server is available. If a server does not provide certain data at a regular reporting time (such as a ping every minute), then the server is presumed to be unavailable. Other example performance metrics include CPU usage, memory usage, network bandwidth, and I/O usage.

A schedule may be an exclusive factor with respect to a particular server if the schedule indicates that requests should not be sent to the particular server during a particular slot and the current time falls within the time period of the particular slot. On the other hand, if the schedule indicates that requests can be sent to the particular server at the current time, then that is merely one factor of multiple factors. Alternatively, a schedule may be a non-exclusive factor with respect to a particular server if the schedule indicates that requests should not be sent. In other words, even if a schedule indicates that a request should not be sent to a particular server at the current time, other factors that are considered may result in sending the request to the particular server anyway. For example, server 132 may be the least loaded server (e.g., in terms of CPU availability and memory usage) of servers 130, but the only server that, according to a schedule, should not be sent requests at the current time.

FIG. 2A is a flow diagram that depicts a process 200 for selecting a server for processing a request, in an embodiment. Process 200 is implemented by a client, such as client 112. Process 200 is implemented if each slot corresponds to a different time period and a different server.

At block 205, the client determines to send a request to a server. Block 205 may be performed in response to receiving a request from a front-end server or directly from an end-user device.

At block 210, the client selects one of servers 130 as a candidate server. Block 210 may involve selecting (e.g., randomly) any of servers 130 or first considering performance metrics or other factors related to servers 130. For example, the client may select the least loaded server in terms of memory usage.

At block 215, the client uses a schedule to determine whether to send a request to the candidate server. Block 215 may involve identifying a slot that corresponds to the candidate server and determining whether the current time is within a time period indicated by the slot.

If the determination at block 215 is negative, then process 200 proceeds to block 220. Else, process 200 proceeds to block 225.

At block 220, the client sends a request to the candidate server and process 200 ends. The request may be identical to a request that the client received from an end-user device or other device, such as a front-end server in distributed system 100. Alternatively, the request may include or indicate a strict subset of data requested from an "upstream" device (i.e., relative to the client). Alternatively, the request may request entirely different data than what is requested in the original request of block 205.

At block 225, the client selects another one of servers 132-138 and sends the request to the other server. In this example, because no two servers are associated with the same slot or time period, the client is assured of selecting a server that is not garbage collecting or about to garbage collect.

Block 225 may involve selecting (e.g., randomly) any of the other servers or first considering performance metrics or other factors related to each of the other servers prior to selecting another server and sending the request to that other server. For example, the client may select the least loaded (in terms of CPU usage) remaining server to process the request.

Figure 2B:
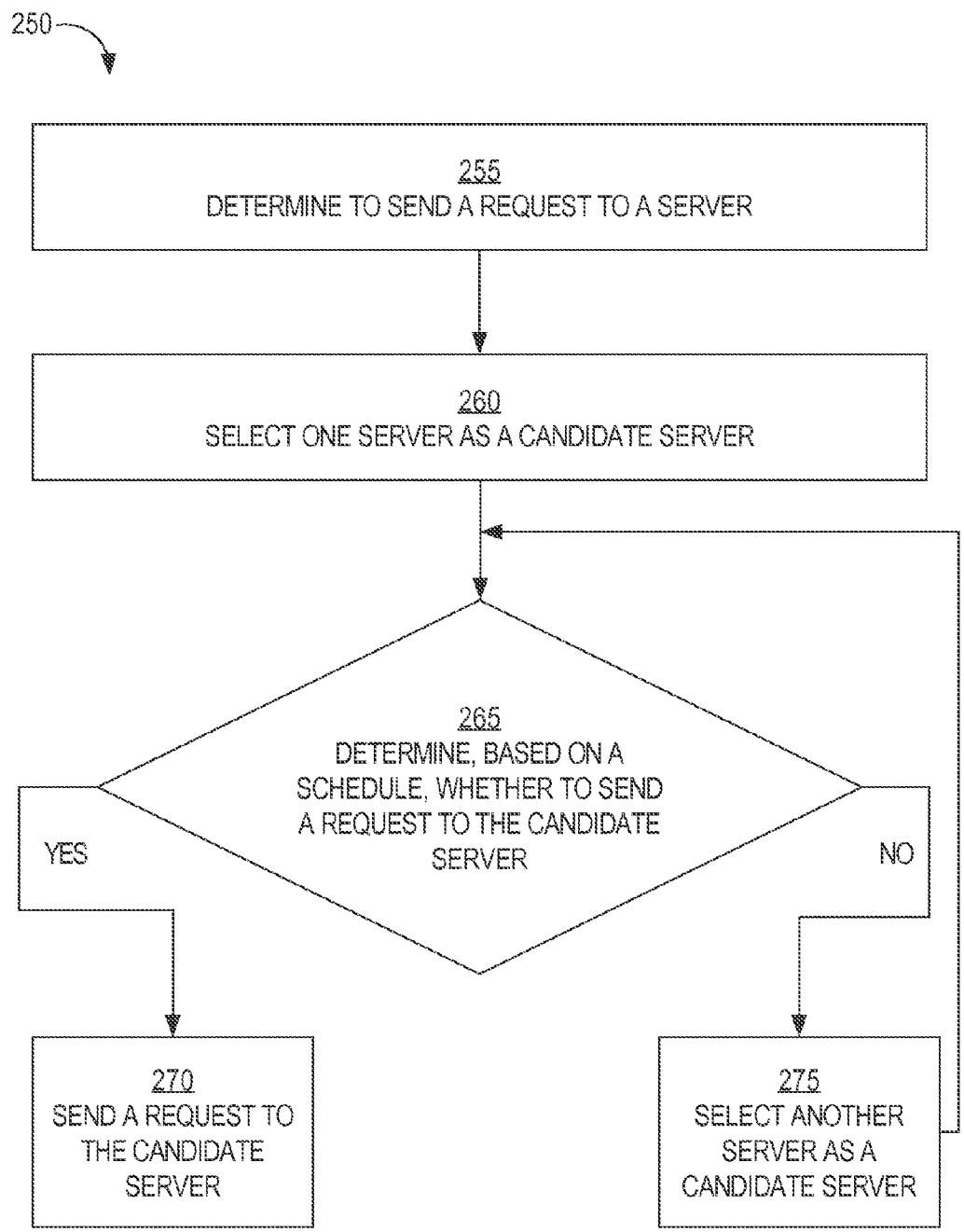

FIG. 2B is a flow diagram that depicts a process 250 for selecting a server for processing a request, in an embodiment. Process 250 is similar to process 200. Process 250 is implemented by a client, such as client 112. Process 250 is implemented if multiple servers are assigned to the same slot or are associated with the same time period, or if multiple slots have overlapping time periods.

At block 255, the client determines to send a request to a server. Block 255 may be performed in response to receiving a request from a front-end server or directly from an end-user device.

At block 260, the client selects one of servers 132-138 as a candidate server. Block 260 may involve selecting (e.g., randomly) any of the other servers or first considering performance metrics or other factors related to servers 132-138. For example, the client may select the least loaded server in terms of CPU usage.

At block 265, the client uses a schedule to determine whether to send a request to the candidate server. Block 265 may involve identifying a slot that corresponds to the candidate server and determining whether the current time is within a time period indicated by the slot.

If the determination at block 265 is negative, then process 250 proceeds to block 270. Else, process 250 proceeds to block 275.

At block 270, the client sends a request to the candidate server and process 200 ends.

At block 275, the client selects another one of servers 132-138 as a candidate server and process 250 proceeds to block 265.

Storing a Schedule

As noted above, one or more of clients 112-116 store (or has access to) a schedule for servers 132-138. Thus, at least one client determines, for each request of multiple requests, based on a schedule, whether to send the request to a server. The schedule may be stored persistently in the computing device on which each client executes. The schedule is later loaded into volatile memory at device start up or at some later time. In this way, checking the schedule may be performed more quickly. Additionally, since a schedule may be accessed frequently (such as once for each request that a client submits), then the schedule may be stored in a cache of the computing device and may be fixed therein so that the schedule is not flushed out for other data.

In a related embodiment, one or more of servers 132-138 store (or have access to) the schedule. This may be useful if one server submits requests to other servers for certain data. Thus, each server may want to know when not to send requests to other servers in order to minimize latency due to the other servers garbage collecting. Thus, each of servers 132-138 may implement process 200 or process 250 (or variations thereof) described herein. Similar to a client, a server may consider multiple criteria in selecting another server to which a request will be sent, where one of the criteria is whether the current time falls within a slot of the other server.

Each of servers 132-138 stores at least a portion of the schedule that indicates when the server should begin garbage collection or when the server should begin draining outstanding requests (from clients 110 or caching devices 120 or both) so that the server can begin garbage collection.

In a related embodiment, if one or more of caching devices 122-126 send requests to servers 132-138, then those caching devices store (or have access to) a schedule. A caching device may receive a request from a client and determine that the caching device does not have all the data necessary to respond fully to the request. The caching device then uses the schedule to determine to which of servers 132-138 to send a request. Thus, each of caching devices 122-126 may implement process 200 or process 250 (or variations thereof) described herein. Similar to a client, a caching device may consider multiple criteria in selecting a server to which a request will be sent, where one of the criteria is whether the current time falls within a slot of the server.

In an embodiment, each of clients 112-116 also perform garbage collection. Thus, other computing devices within or outside of distributed system 100 may store a schedule for clients 110 in order to avoid latency due to garbage collection performed by clients 110. Thus, a different schedule may exist for clients 110, caching devices 120, and servers 130, since each computing device may implement different garbage collection techniques, have different memory capacities, and/or have different processing speed and power.

Determining a Schedule

A schedule may be determined manually or automatically. For example, a computer process examines a history of request processing from one or more of servers 132-138. The history may be reflected in one or more logs of records. One log of records may pertain to garbage collection times that occur independent of processing requests. Another log of records may pertain to request processing times that occur independent of garbage collection. Each record in the garbage collection log indicates an amount of time to perform a garbage collection operation according to a time measurement, such as number of milliseconds or number of CPU cycles. The record log may be from a single server or from multiple (e.g., all) servers of servers 132-138. Different records indicate different amounts of time. The difference in amounts of time to perform a garbage collection operation may be due to multiple factors, such as different amounts of memory to "clean up," different versions of software of the different servers that perform the garbage collection operation, and different garbage collection algorithms that are implemented.

The computer process then sets $T_{GC}$ to be a value that corresponds to the maximum temporal length indicated in the record log. Alternatively, the computer process sets $T_{GC}$ to be twice the maximum temporal length, 110% of the maximum temporal length, or some other value that is more than or less than the maximum temporal length.

Each record in a request processing log indicates an amount of time for one or more servers to process a set of requests after the servers were prevented from receiving any more requests. In other words, each record indicates a time to "drain" a queue of pending requests by responding to all the pending requests. The more requests that are pending at a server, the longer it will take to process those requests. Thus, each server may be limited to a certain number of pending requests (e.g., one hundred), after which a client is not supposed to send any more requests to that server, independent of what the schedule indicates for that server. A process that analyzes a request processing log may determine an average time, a maximum time, a median (or other quantile) time for servers to process one or more requests (e.g., ten requests). The process may then use that determined time as part of a slot time or generate another time (e.g., 110% of the maximum time) based on that determined time and use that other time as part of the slot time.

For example, an administrator of distributed system 100 may specify each slot of a schedule and cause copies of the schedule to be stored on one or more of clients 112-116. The administrator may determine a schedule similar to the automatic approach, i.e., by examining a garbage collection record log to determine a $T_{GC}$ and examining a request processing log to determine a $T_R$.

As noted previously, $T_{GC}+T_R$ results in a slot time ($T_S$). A time period $T_P$ is established in which each server will perform a garbage collection operation exactly once and divided into (possibly overlapping) slices of length $T_S = T_{GC}+T_R$. Each of servers 132-138 may be assigned to a slot using one of multiple techniques. In one technique, servers 130 are hashed into each slot using machine unique information, such as IP address, machine+port number, MAC address, or other computing device identifier. As a result, each server t≡N is given an offset within $T_P$ of $T_{off}^i$. This offset demarcates a slice of time (of length $T_S$) for each server i during which any outstanding requests (or requests that have been received but not yet fully processed) are processed and garbage collection is forced or initiated. Thus, clients 110 cease sending server i requests at time t≡$T_{off}^i$ mod $T_P$, server i begins garbage collection at time t≡($T_{off}^i+T_R$) mod $T_P$, and clients resume sending requests to server i at t≡($T_{off}^i+T_S$) mod $T_P$.

Because a server is not receiving traffic for $T_S$ every $T_P$, n operable servers are ensured with $n*T_P/(T_P-T_S)$ total servers. For example, if 900 operable servers are desired and $T_S$ is ~800 ms, and $T_P$ is 4 seconds, then 1125 servers in total would be needed. Also, during any given slot, 20% (1/5) of the hosts (or 225 hosts) would be unable to receive requests.

Figure 3:
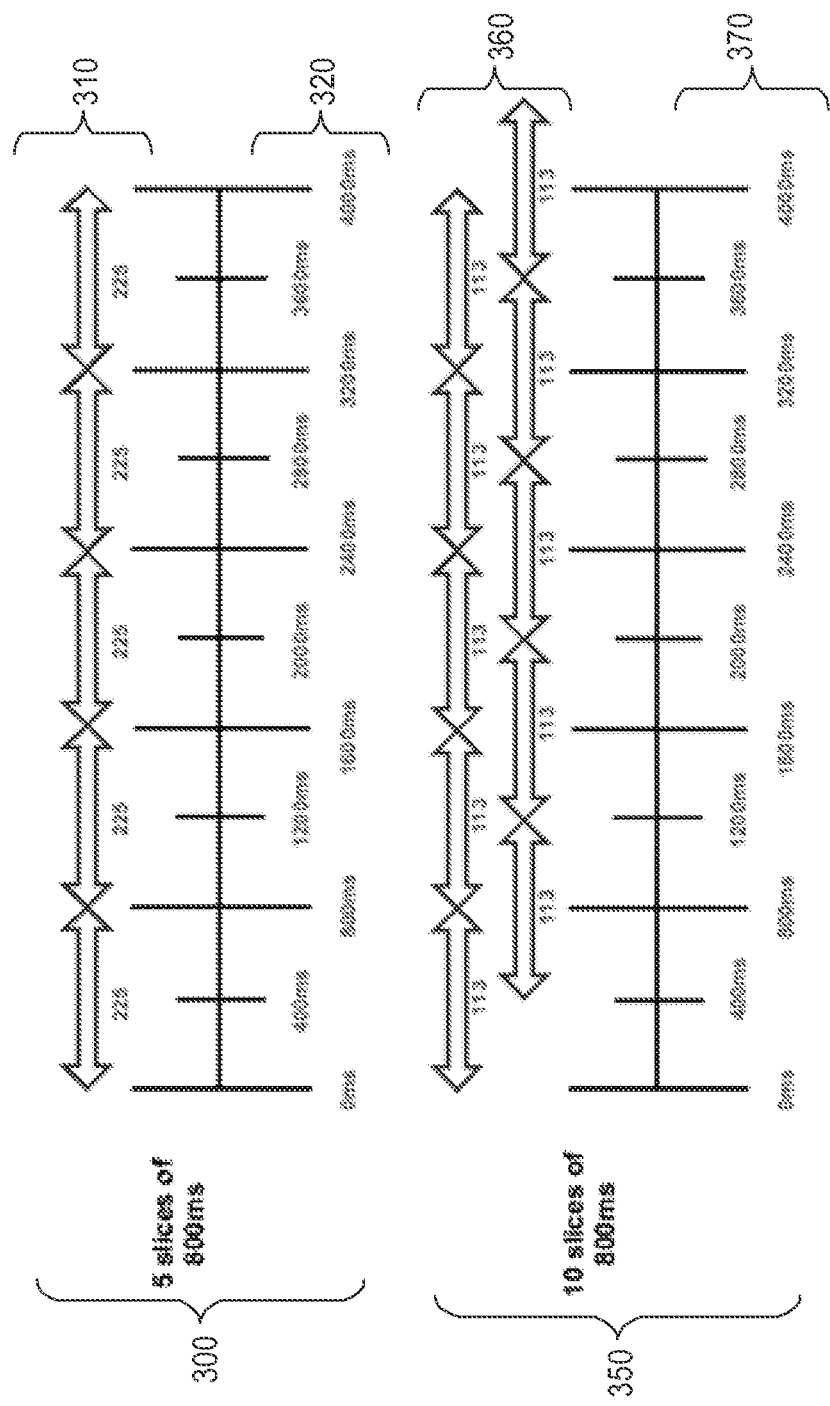
FIG. 3 is a block diagram that depicts two example timelines corresponding to different schedules.

FIG. 3 is a block diagram that depicts two example timelines (300 and 350) corresponding to different schedules. Each timeline includes information indicating (1) a number of servers down for garbage collection (310 and 360) during each slot and (2) a number of milliseconds from server boot-up (320 and 370, which is the same for both timelines). Each timeline is divided into increments of 400 milliseconds. One difference between timelines 300 and 350 is timeline 300 is based on a schedule of five slots (or "slices") while timeline 350 is based on a schedule of ten slots (or "slices").

Number of servers 310 indicates that, for each slot, 225 servers are assigned to that slot and are, therefore, scheduled for garbage collection. As noted previously, some of the time period for each slot may be used to drain or process any outstanding requests. Number of servers 360 indicates that 113 servers are assigned to each of the ten slots. However, the slots are staggered or overlap, whereas the slots in timeline 300 do not overlap. Thus, other than the first slot, about 226 servers are scheduled for garbage collection (and, optionally, draining) for each slot.

In an embodiment, $T_P$ includes an amount of time for expected network latency. Network latency may be calculated in any number of ways. A computer process or a human user may analyze network traffic or network pings from one networked device to another to determine average, median, or maximum network latency. If network latency is negligible (e.g., less than one millisecond), then $T_P$ might not take into account network latency.

If network latency fluctuates over time, then different schedules may be used. For example, client 112 may use (1) a first schedule when sending requests to servers 130 during morning hours when network traffic is relatively high and (2) a second schedule when sending requests to servers 130 during late evening hours when network traffic is relatively low. Thus, the decision of which schedule to use is based on current network conditions or historical network conditions during the present time of day.

In an embodiment, a schedule is created that includes one or more "empty" slots. An empty slot is a slot that is not associated with any servers. One reason to generate a schedule with an empty slot is to plan for the addition of servers to distributed system 100 in the future. Thus, when one or more new servers come online, those servers are assigned to one of the empty slots.

In an embodiment, multiple slots within a schedule are associated with different time periods. For example, one slot may be associated with 800 milliseconds while another slot may be associated with one second. The difference in slot time may be due to different types of servers, software, and/or computing nodes. For example, server 132 may have been developed by one vendor and server 134 may have been developed by another vendor. As another example, server 132 may be hosted by a computing device that was manufactured by one vendor and server 134 may be hosted by a computing device that was manufactured by another vendor.

Cluster Embodiment

In an embodiment, distributed system 100 includes multiple clusters in place of servers 130. Each cluster comprises multiple machines or computing nodes (e.g., 20). Each cluster has access to a copy of the same data. Each computing node in a cluster may be assigned a different partition of the data. Thus, one machine in cluster 1 is assigned one copy of a set of data and one machine in cluster 2 is assigned another copy of the same set of data.

In this embodiment, all machines in a cluster perform a garbage collection operation at the same time. Thus, an entire cluster corresponds to a single slot. Also, during a slot of a cluster, no requests are sent to that cluster.

Alternatively, different machines in the same cluster are assigned different slots for garbage collecting. If partitions are assigned in an orderly fashion in each cluster such that machine 1 of each cluster is assigned to a copy of the same partition, then a single schedule may be used for all clusters. If, on the other hand, partitions are assigned to machines in each cluster in a different fashion (e.g., randomly), then a different schedule may exist for each cluster. In this scenario, if a client (and/or caching device) is cluster-aware, then the client may have access to a different schedule for each cluster. Otherwise, if the client is not cluster-aware, then the client will not use any such cluster-specific schedule even if such a cluster-specific schedule exists.

Benefits

A benefit of not sending requests to servers that are garbage collecting or are about to garbage collect is that garbage collection may have zero impact on processing requests from clients. Thus, servers can garbage collect less often and spend less overall time in garbage collection.

Compared to fully concurrent garbage collection, at least some embodiments allow CPU cycles of a server to be completely dedicated to processing requests (as opposed to simultaneously processing requests and garbage collecting). Furthermore, a garbage collection algorithm does not have to consider changes to the state while garbage collection is occurring; thus, allowing the algorithm to be more efficient and spending less CPU time garbage collecting.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
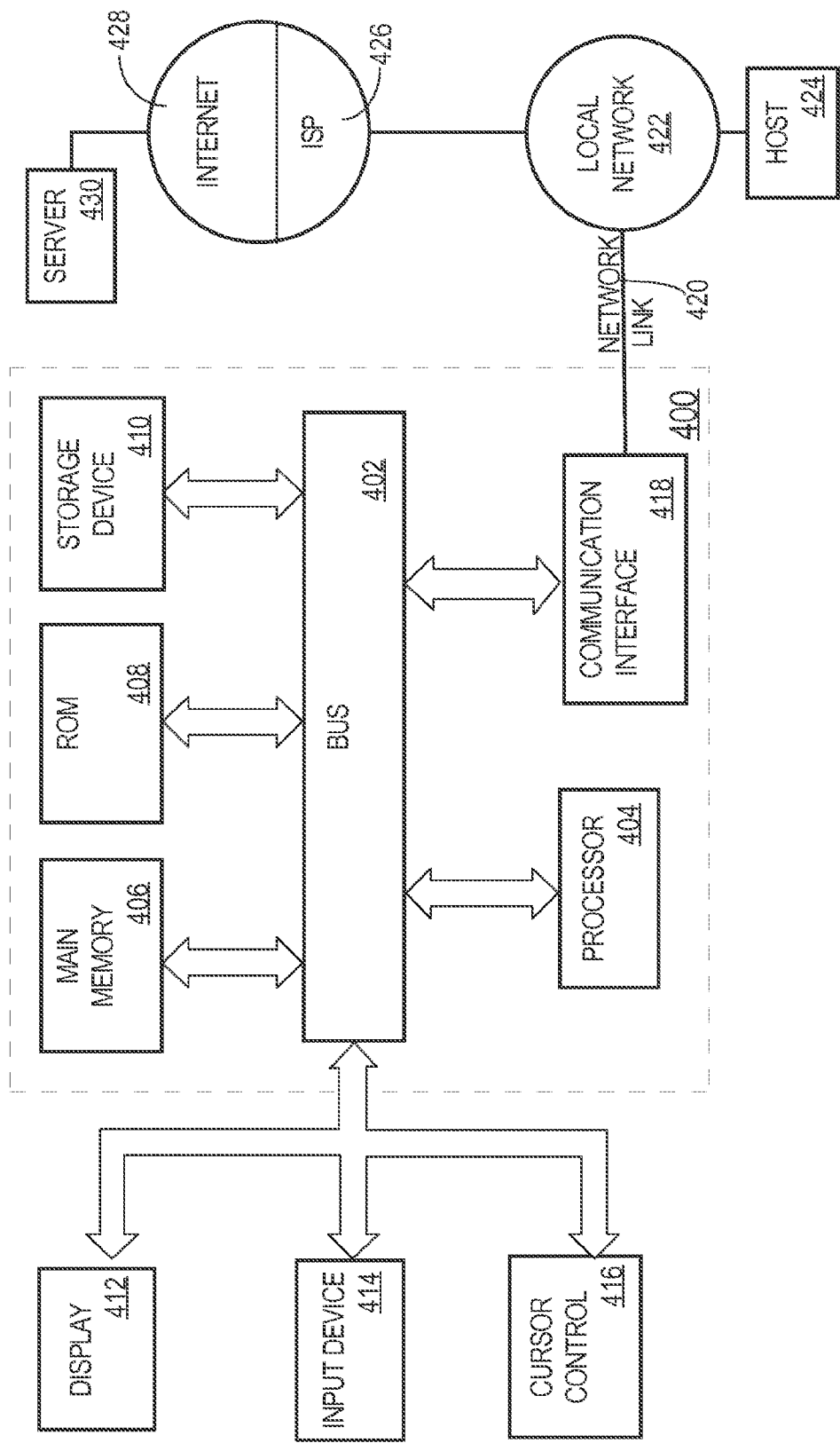
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing, at a particular computing device, time data that indicates when each computing node of a plurality of computing nodes might be performing a garbage collection operation;
receiving, at the particular computing device, a first request;
in response to receiving the first request, determining, at the particular computing device, based on the time data, one or more computing nodes, of the plurality of computing nodes, to process a second request;
sending the second request to the one or more computing nodes;
wherein the method is performed by one or more computing devices.

2. The method of claim 1, further comprising:
storing the time data at a plurality of computing devices that are different than the plurality of computing nodes and that includes the particular computing device;
wherein each computing device of the plurality of computing devices receives requests for data stored by the plurality of computing nodes.

3. The method of claim 1, further comprising:
storing the time data at a plurality of caching devices, each of which receives, from the particular computing device, requests for data stored by the plurality of computing nodes.

4. The method of claim 3, further comprising:
receiving, from the particular computing device, at a caching device of the plurality of caching devices, a third request;
in response to receiving the third request, determining, by the caching device, based on the time data, one or more second computing nodes, of the plurality of computing nodes, to process a fourth request that is related to the second request.

5. The method of claim 1, further comprising:
storing the time data at each computing node of the plurality of computing nodes.

6. The method of claim 5, further comprising:
receiving, at a particular computing node of the plurality of computing nodes, a third request;
in response to receiving the third request, determining, at the particular computing node, based on the time data, one or more second computing nodes, of the plurality of computing nodes, to process a fourth request that is related to the third request;
sending the fourth request to the one or more second computing nodes.

7. The method of claim 1, wherein a first time period during which to not send requests to a first computing node of the plurality of computing nodes is determined based on a request time period to process one or more requests and a collection time period to perform the garbage collection operation.

8. The method of claim 7, further comprising:
generating and storing a plurality of garbage collection records;
wherein each garbage collection record of the plurality of garbage collection records indicates an amount of time to perform the garbage collection operation;
identifying a particular record, of the plurality of garbage collection records, that indicates a particular amount of time that is longer than the amounts of time indicated by other garbage collection records of the plurality of garbage collection records;
determining the collection time period based on the particular amount of time.

9. The method of claim 7, wherein a second time period during which to not send requests to a second computing node of the plurality of computing nodes is determined based on a second request time period to process a request and a second collection time period to perform a garbage collection, wherein the second time period is different than the first time period.

10. The method of claim 1, wherein:
the time data is first time data that is different than second data time that is stored at the particular computing device and that indicates when each computing node of the plurality of computing nodes might be performing a garbage collection operation;
the method further comprising:
receiving, at the particular computing device, a third request;
in response to receiving the third request, determining, at the particular computing device, based on the second time data, one or more second computing nodes, of the plurality of computing nodes, to process a fourth request;
sending the fourth request to the one or more second computing nodes.

11. The method of claim 10, further comprising, prior to receiving the third request:
determining, by the particular computing device, based on network latency, which time data of the first time data and the second time data to use;
wherein determining the one or more second computing nodes comprises determining the one or more second computing nodes in response to determining to use the second time data.

12. A system comprising:
one or more processors;
one or more storage media storing instructions which, when executed by the one or more processors, cause:
storing, at a particular computing device, time data that indicates when each computing node of a plurality of computing nodes might be performing a garbage collection operation;
receiving, at the particular computing device, a first request;
in response to receiving the first request, determining, at the particular computing device, based on the time data, one or more computing nodes, of the plurality of computing nodes, to process a second request;
sending the second request to the one or more computing nodes.

13. The system of claim 12, wherein the instructions, when executed by the one or more processors, further cause:
storing the time data at a plurality of computing devices that are different than the plurality of computing nodes and that includes the particular computing device;
wherein each computing device of the plurality of computing devices receives requests for data stored by the plurality of computing nodes.

14. The system of claim 12, wherein the instructions, when executed by the one or more processors, further cause:
storing the time data at a plurality of caching devices, each of which receives, from the particular computing device, requests for data stored by the plurality of computing nodes.

15. The system of claim 14, wherein the instructions, when executed by the one or more processors, further cause:
receiving, from the particular computing device, at a caching device of the plurality of caching devices, a third request;
in response to receiving the third request, determining, by the caching device, based on the time data, one or more second computing nodes, of the plurality of computing nodes, to process a fourth request that is related to the second request.

16. The system of claim 12, wherein the instructions, when executed by the one or more processors, further cause:
storing the time data at each computing node of the plurality of computing nodes.

17. The system of claim 16, wherein the instructions, when executed by the one or more processors, further cause:
receiving, at a particular computing node of the plurality of computing nodes, a third request;
in response to receiving the third request, determining, at the particular computing node, based on the time data, one or more second computing nodes, of the plurality of computing nodes, to process a fourth request that is related to the third request;
sending the fourth request to the one or more second computing nodes.

18. The system of claim 12, wherein a first time period during which to not send requests to a first computing node of the plurality of computing nodes is determined based on a request time period to process one or more requests and a collection time period to perform the garbage collection operation.

19. The system of claim 18, wherein the instructions, when executed by the one or more processors, further cause:
generating and storing a plurality of garbage collection records;
wherein each garbage collection record of the plurality of garbage collection records indicates an amount of time to perform the garbage collection operation;
identifying a particular record, of the plurality of garbage collection records, that indicates a particular amount of time that is longer than the amounts of time indicated by other garbage collection records of the plurality of garbage collection records;
determining the collection time period based on the particular amount of time.

20. The system of claim 12, wherein:
the time data is first time data that is different than second data time that is stored at the particular computing device and that indicates when each computing node of the plurality of computing nodes might be performing a garbage collection operation;
the instructions, when executed by the one or more processors, further cause:
receiving, at the particular computing device, a third request;
in response to receiving the third request, determining, at the particular computing device, based on the second time data, one or more second computing nodes, of the plurality of computing nodes, to process a fourth request;
sending the fourth request to the one or more second computing nodes.

* * * * *